(12) United States Patent
Tang

(10) Patent No.: US 12,058,629 B2
(45) Date of Patent: Aug. 6, 2024

(54) COMMUNICATION METHOD AND COMMUNICATION DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 690 days.

(21) Appl. No.: 17/221,587

(22) Filed: Apr. 2, 2021

(65) Prior Publication Data
US 2021/0227482 A1 Jul. 22, 2021

Related U.S. Application Data

(63) Continuation of application No. PCT/CN2018/109363, filed on Oct. 8, 2018.

(51) Int. Cl.
*H04W 56/00* (2009.01)
*H04W 72/0446* (2023.01)

(52) U.S. Cl.
CPC ... *H04W 56/0005* (2013.01); *H04W 72/0446* (2013.01)

(58) Field of Classification Search
CPC ............ H04W 56/0005; H04W 72/0446
See application file for complete search history.

(56) References Cited

U.S. PATENT DOCUMENTS

2020/0045629 A1* 2/2020 Choi ................. H04W 52/0206
2020/0366438 A1* 11/2020 Rahman ............ H04L 27/26025

FOREIGN PATENT DOCUMENTS

| CN | 106797265 A | 5/2017 |
| WO | 2017160131 A1 | 9/2017 |
| WO | 2018143879 A1 | 8/2018 |
| WO | 2018143882 A1 | 8/2018 |

OTHER PUBLICATIONS

Extended European Search Report for European Application No. 18936592.7 issued Sep. 8, 2021. 8 pages.
Huawei et al. "On remaining issues for On/Off mask" R4-1811315; 3GPP TSG-RAN WG4 Meeting #88, Aug. 20-24, 2018. 4 pages.
OPPO "Discussion on dynamic transient period location for NR" R4-1810408; 3GPP TSG-RAN WG4 Meeting #88; Aug. 20-24, 2018. 5 pages.

(Continued)

*Primary Examiner* — Samina F Choudhry
(74) *Attorney, Agent, or Firm* — PERKINS COIE LLP (57) ABSTRACT

The implementations of the present disclosure relate to a communication method and a communication device. The method includes: a communication device acquiring a position or proportion of a first transition time occupied in a spacing symbol; the communication device determining, on the basis of the position or proportion of the first transition time occupied in the spacing symbol, whether to transmit data on the spacing symbol. The communication method and the communication device in the implementations of the present disclosure can determine whether to transmit data on a spacing symbol with a high accuracy.

12 Claims, 3 Drawing Sheets

(56) References Cited

OTHER PUBLICATIONS

Qualcomm "Effect of blanking one symbol for Highest Sub-carrier Spacing" R4-1810565; 3GPP TSG-RAN4 Meeting #88; Aug. 20-24, 2018. 13 pages.
Vivo "WF on remaining issues on NR On/Off time masks" R4-1811471; 3GPP TSG-RAN WG4 #88 Meeting; Aug. 20-24, 2018. 8 pages.
3GPP TS 38.101-1 V15.2.0 (Jun. 2018)—3rd Generation Partnership Project; Technical Specification Group Radio Access Network; NR; User Equipment (UE) radio transmission and reception; Part 1: Range 1 Standalone (Release 15) (126 pages).
International Search Report issued Jun. 27, 2019 of PCT/CN2018/109363 (5 pages).

* cited by examiner

A communication device acquires a position or proportion occupied by a first transition time in a spacing symbol — 410

The communication device determines whether to transmit data on the spacing symbol based on the position or proportion occupied by the first transition time in the spacing symbol — 420

COMMUNICATION METHOD AND COMMUNICATION DEVICE

CROSS-REFERENCE TO RELATED APPLICATION

The present application is a continuation application of International PCT Application No. PCT/CN2018/109363, filed on Oct. 8, 2018, the entire content of which is hereby incorporated by reference.

TECHNICAL FIELD

The present disclosure relates to the field of communications, in particular to a communication method and a communication device.

BACKGROUND

In a 5-Generation (5G) system, when a power change or a frequency change occurs between consecutive short subslot transmission symbols, transient time will occur between the consecutive short subslot transmission symbols.

Short subslots with transient times on both sides may be called spacing symbols. In the 5G system, a plurality of SubCarrier Spacings (SCS) are introduced. When the subcarrier spacing is relatively high, how to determine whether to transmit data on a spacing symbol is an urgent problem to be solved.

SUMMARY

Implementations of the present disclosure provide a communication method and a communication device, which can determine whether to transmit data on a spacing symbol with a high accuracy.

In a first aspect, there is provided a communication method, including: acquiring, by a communication device, a position or proportion occupied by a first transient time in a spacing symbol: and
  determining, by the communication device and on the basis of the position or proportion occupied by the first transient time in a spacing symbol, whether to transmit data on the spacing symbol.

In a second aspect, there is provided a communication device, configured to perform the method in the first aspect or in various implementation modes thereof.

Specifically, the communication device includes functional modules for performing the method in the first aspect or in various implementation modes thereof.

In a third aspect, there is provided a communication device, including a processor and a memory. The memory is used for storing a computer program, and the processor is used for calling and running the computer program stored in the memory to perform the method in the first aspect or in various implementation modes thereof.

In a fourth aspect, there is provided a chip for implementing the method in the first aspect or in various implementation modes thereof.

Specifically, the chip includes a processor for calling and running a computer program from a memory, to enable a device in which the chip is installed to perform the method in the first aspect or in various implementation modes thereof.

In a fifth aspect, there is provided a computer readable storage medium for storing a computer program that enables a computer to perform the method in the first aspect or in various implementation modes thereof.

In a sixth aspect, there is provided a computer program product, including computer program instructions that enable a computer to perform the method in the first aspect or in various implementation modes thereof.

In a seventh aspect, there is provided a computer program which, when run on a computer, enables the computer to perform the method in the first aspect or in various implementation modes thereof.

According to the above technical solutions, the communication device determines, through an acquired position or proportion occupied by a transient time in a spacing symbol, whether to transmit data on the spacing symbol, so that whether to transmit data on a spacing symbol can be determined with a high accuracy.

DETAILED DESCRIPTION

The technical solution in implementations of the present disclosure will be described below with reference to the drawings in implementations of the present disclosure. It is apparent that the implementations described are just some implementations of the present disclosure, but not all implementations of the present disclosure. According to the implementations of the present disclosure, all other implementations achieved by a person of ordinary skills in the art without paying an inventive effort are within the protection scope of the present disclosure.

The technical solutions of the implementations of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, a LTE Frequency Division Duplex (FDD) system, LTE Time Division Duplex (TDD), a Universal Mobile Telecommunication System (UMTS), a Worldwide Interoperability for Microwave Access (WiMAX) communication system, or a 5G system, etc.

Figure 1:
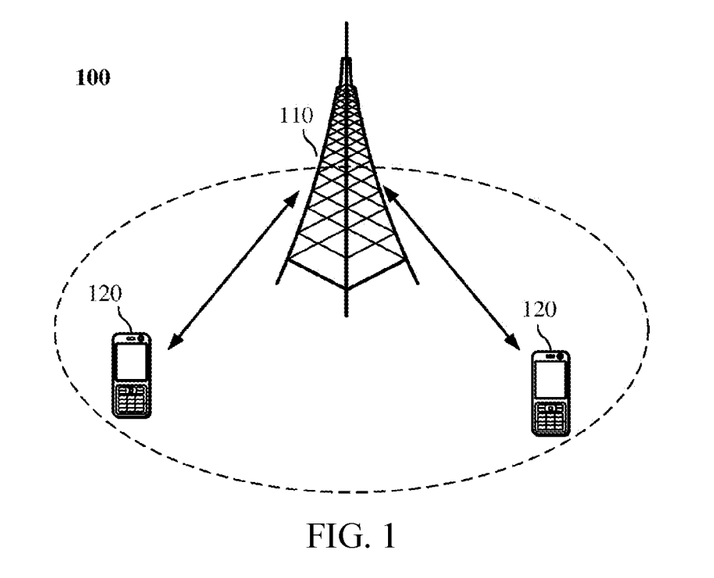
FIG. 1 is a schematic diagram of an architecture of a communication system according to an implementation of the present disclosure.

Illustratively, a communication system 100 applied in an implementation of the present disclosure is as shown in FIG. 1. The communication system 100 may include a network device 110, and the network device 110 may be a device that communicates with a terminal device 120 (or referred to as a communication terminal, or a terminal). The network device 110 may provide communication coverage for a specific geographical area, and may communicate with terminal devices located within the coverage area. Optionally, the network device 110 may be a Base Transceiver Station (BTS) in a GSM system or CDMA system, a NodeB (NB) in a WCDMA system, an Evolutional Node B (eNB or eNodeB) in a LTE system, or a radio controller in a Cloud Radio Access Network (CRAN), or the network device may be a network side device in a mobile switch center, a relay station, an access point, a vehicle-mounted device, a wearable device, a hub, a switch, a bridge, a router, or a 5G network, or a network device in a future evolved Public Land Mobile Network (PLMN), etc.

The communication system 100 further includes at least one terminal device 120 located within the coverage area of the network device 110. As used herein, the term "terminal device" includes, but is not limited to, a device configured to receive/send a communication signal via a wired line, for example, via a Public Switched Telephone Network (PSTN), a Digital Subscriber Line (DSL), a digital cable, a direct cable: and/or another data connection/network: and/or via a wireless interface, for instance, for a cellular network, a Wireless Local Area Network (WLAN), a digital television network such as a DVB-H network, a satellite network, and an AM-FM broadcast transmitter: and/or another terminal device: and/or an Internet of Things (IoT) device. A terminal device configured to communicate via a wireless interface may be referred to as a "wireless communication terminal", a "wireless terminal" or a "mobile terminal". Examples of the mobile terminal include, but not limited to, a satellite or cellular telephone, a Personal Communications System (PCS) terminal that can be combined a cellular wireless telephone and data processing, faxing, and data communication abilities, a PDA that may include a radio telephone, a pager, an internet/intranet access, a Web browser, a memo pad, a calendar, and/or a Global Positioning System (GPS) receiver, and a conventional laptop and/or palmtop receiver or another electronic apparatus including a radio telephone transceiver. The terminal device may be referred to as an access terminal, User Equipment (UE), a subscriber unit, a subscriber station, a mobile station, a rover station, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing devices connected to a wireless modem, a vehicle-mounted device, a wearable device, a terminal device in a 5G network, or a terminal device in a future evolved PLMN, or the like.

Optionally, Device to Device (D2D) communication may be performed between the terminal devices 120.

Optionally, a 5G system or a 5G network can also be called a New Radio (NR) system or a NR network.

FIG. 1 shows one network device and two terminal devices as an example. Optionally, the communication system 100 may include a plurality of network devices, and other quantities of terminal devices may be included within the coverage area of each network device, and this is not limited in the implementations of the present disclosure.

Optionally, the communication system 100 may further include other network entities such as a network controller and a mobile management entity, which is not limited in the implementations of the present disclosure.

It should be understood that devices with communication function in a network/system may be referred to as communication devices in the implementations of the present disclosure. Taking the communication system 100 as shown in FIG. 1 as an example, communication devices may include a network device 110 and a terminal device 120 which have communication function, and the network device 110 and the terminal device 120 may be the specific devices described above, which will not be described here again. The communication devices may alternatively include other devices in the communication system 100, e.g., other network entities such as a network controller and a mobile management entity, which is not limited in the implementations of the present disclosure.

Figure 2:
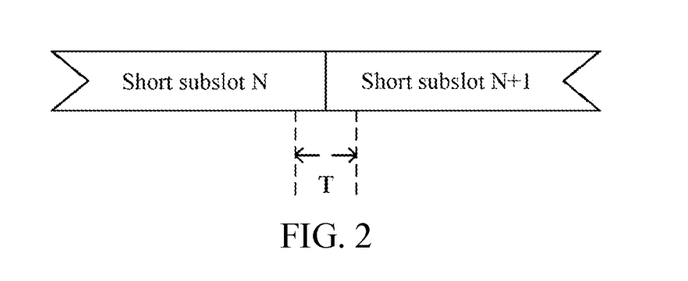
FIG. 2 is a schematic diagram of a transient time according to an implementation of the present disclosure.

When a power change or a frequency change occurs between consecutive short subslot transmission symbols, transient times will occur between the consecutive short subslot transmission symbols. As shown in FIG. 2, power between a short subslot N and a short subslot N+1 changes, then a transient time T occurs between the short subslot N and the short subslot N+1. When a working frequency band of a terminal device is below 6 GHZ, T may be up to 10 μs: and when the working frequency band of the terminal device is above 6 GHZ, T may be up to 5 μs.

Optionally, a short subslot in an implementation of the present disclosure may include one symbol or two symbols. Illustratively, the short subslot N may include one symbol, and the short subslot N+1 may include two symbols. Alternatively, the short subslot N and the short subslot N+1 may each include one symbol or two symbols.

It should be understood that in an implementation of the present disclosure, the transient time may also be called a transient period or other names, which is not specifically limited in the implementations of the present disclosure.

Figure 3:
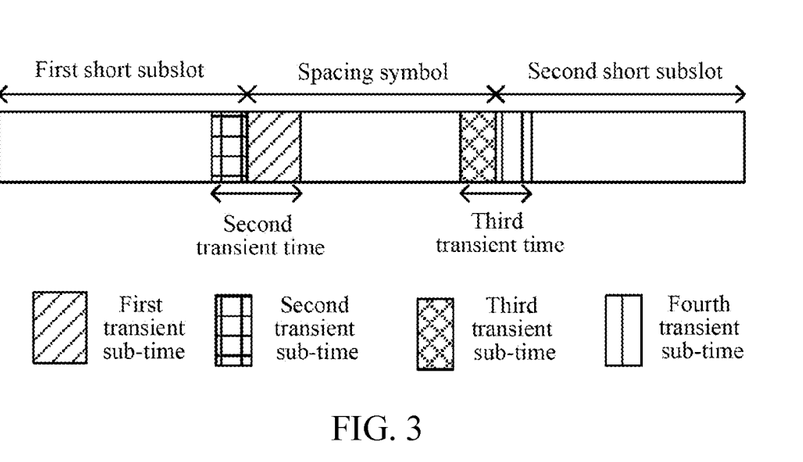
FIG. 3 is a schematic diagram of a transient time and a spacing symbol according to an implementation of the present disclosure.

When a short subslot has transient times on both sides, the short subslot may be called a spacing symbol. As shown in FIG. 3, the parts filled with patterns denote transient times. It can be seen that there are transient times on both sides of a spacing symbol. When the working frequency band of a terminal device is below 6 GHZ, a length T2 of a spacing symbol may be 17.86 μs. When the working frequency band of the terminal device is above 6 GHZ, the length T2 of the spacing symbol may be 8.93 μs.

When the subcarrier spacing is relatively high, the communication device may or may not transmit data on the spacing symbol. Therefore, how the communication device determines whether to transmit data on a spacing symbol is an urgent problem to be solved. In view of this, an implementation of the present disclosure provides a communication method, in which a communication device can determine whether to transmit data on a spacing symbol.

Figure 4:
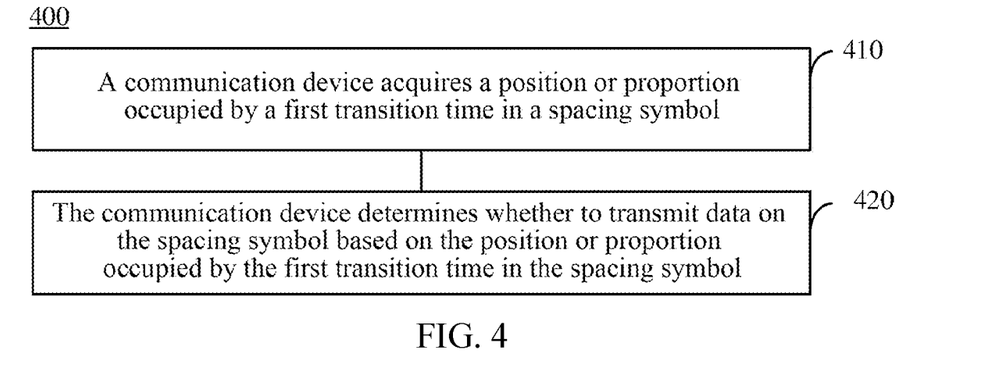
FIG. 4 is a schematic flow chart of a communication method according to an implementation of the present disclosure.

FIG. 4 is a schematic flow chart of a communication method 400 according to an implementation of the present disclosure. The method 400 may include at least part of the following contents.

In 410, a communication device acquires a position or proportion occupied by a first transient time in a spacing symbol.

In 420, the communication device determines, on the basis of the position or proportion occupied by the first transient time in the spacing symbol, whether to transmit data on the spacing symbol.

In an implementation of the present disclosure, if the communication device cannot transmit data on a spacing symbol, the spacing symbol may be called a blank symbol.

If the communication device can transmit data on a spacing symbol, it can be referred to as performing symbol recovery for the spacing symbol.

Optionally, in an implementation of the present disclosure, a second transient time may include a first transient sub-time and a second transient sub-time. The first transient sub-time is a time occupied by the first transient time or the second transient time in an end part of the spacing symbol, the second transient sub-time is a time occupied by the second transient time in the first short subslot, and the first short subslot and the spacing symbol are continuous in time domain.

With continued reference to FIG. 3, the first transient sub-time and a third transient sub-time constitute the first transient time, the first transient sub-time and the second transient sub-time constitute the second transient time, the first transient sub-time is a time occupied by the first transient time or the second transient time in the left end part of the spacing symbol, and the third transient sub-time is a time occupied by the first transient time in the right end part of the spacing symbol.

Optionally, in an implementation of the present disclosure, the first transient sub-time and the second transient sub-time may each account for any proportion of the second transient time.

As an example, the first transient sub-time and the second transient sub-time may be the same, that is, the first transient sub-time and the second transient sub-time may each occupy half of the second transient time. For example, the second transient time is 10 µs, then the first transient sub-time and the second transient sub-time are each 5 µs.

As another example, the first transient sub-time and the second transient sub-time may be different. For example, the second transient time is 10 µs, the first transient sub-time may be 3 µs, and the second transient sub-time may be 7 µs: alternatively, the first transient sub-time is 10 µs, the second transient sub-time may be 0, and at this time, the second transient time is entirely within the spacing symbol.

In a possible implementation, acquiring, by the communication device, a position or a proportion occupied by the first transient time in the spacing symbol may include: determining, by the communication device, the position or proportion occupied by the first transient time in the spacing symbol, on the basis of the second transient time, a third transient time and a preset rule. The third transient time includes a time occupied by the first transient time in the other end part of the spacing symbol.

Referring to FIG. 3 again, it can be seen that the third transient time includes a third transient sub-time and a fourth transient sub-time. The third transient sub-time is a time occupied by the first transient time in the right end part of the spacing symbol, the fourth transient sub-time is a time in the left end part of the second short subslot, and the second short subslot and the spacing symbol are continuous in time domain.

Optionally, in an implementation of the present disclosure, the second transient time is the same as the third transient time.

Optionally, the preset rule may be specified in a protocol.

Optionally, the preset rule may be determined by a network device. When the communication device is a terminal device, the network device may send to the terminal device information indicating the preset rule, and after receiving the information, the terminal device may determine the preset rule.

In an implementation of the present disclosure, referring to FIG. 3, illustratively, the preset rule may be that the first transient sub-time accounts for n % of the second transient time and the third transient sub-time accounts for m % of the third transient time, wherein n and m are non-negative numbers, and n and m may be the same or different.

The determining, by the communication device, the position or proportion occupied by the first transient time in the spacing symbol, on the basis of the second transient time, the third transient time and the preset rule may be, for example, as follows. When the working frequency band of the terminal device is below 6 GHz and the subcarrier spacing is greater than or equal to 60 KHz, the second transient time and the third transient time are 10 µs, the preset rule is that the first transient sub-time accounts for 50% of the second transient time and the third transient sub-time accounts for 70% of the third transient time, then the time occupied by the second transient time in the spacing symbol is 5 µs, the time occupied by the third transient time in the spacing symbol is 3 µs, then the time occupied by the first transient time in the spacing symbol is 8 µs, accounting for 45%.

It should be understood that in the implementations of the present disclosure, the terms such as "first", "second" and "third" are only for distinguishing different objects, but do not limit the scope of the implementations of the present disclosure.

When the communication device is a network device, the determining, by the communication device, the position or proportion occupied by the first transient time in the spacing symbol, on the basis of the second transient time, the third transient time and the preset rule may include: receiving, by the network device, first capability information of a terminal device sent by the terminal device, wherein the first capability information may be used for indicating the second transient time and the third transient time. After receiving the first capability information, the network device may determine the position or proportion occupied by the first transient time in the spacing symbol, on the basis of the second transient time, the third transient time and the preset rule.

The second transient time or the third transient time may constitute a set of discontinuous numerical values, for example, when the working frequency band of the terminal device is below 6 GHZ, the set may be {1 µs, 2 µs . . . , 10 µs}, and when the working frequency band of the terminal device is above 6 GHZ, the set may be {1 µs, 2 µs . . . , 5 µs}.

Optionally, the terminal device may send the first capability information to the network device periodically. For example, the terminal device may send the first capability information to the network device every 1 ms.

Optionally, the sending of the first capability information by the terminal device to the network device may be an event-triggered sending. For example, the terminal device may send the first capability information to the network device when performing a cell handover, or the terminal device may send the first capability information to the network device when performing an initial access, or the terminal device may send the first capability information to the network device when the length of the spacing symbol changes.

It should be understood that the second transient time and the third transient time do not change during the time period of the previous sending and the current sending of the first capability information by the terminal device to the network device.

Optionally, the terminal device may send to the network device the first capability information alone or together with other information. For example, after the completion of the initial access, the terminal device may simultaneously send the first capability information and information informing the network device of the completion of the initial access.

After determining the position or proportion occupied by the first transient time in the spacing symbol, the network device may send first indication information to the terminal device, wherein the first indication information may be used for indicating the position or proportion occupied by the first transient time in the spacing symbol.

Optionally, the first indication information may explicitly indicate the position or proportion occupied by the first transient time in the spacing symbol. For example, the first indication information may indicate that the proportion of the first transient time in the spacing symbol is 70%.

Optionally, the first indication information may implicitly indicate the position or proportion occupied by the first transient time in the spacing symbol. For example, the first indication information may indicate the second transient time, the third transient time, the second transient sub-time and the fourth transient sub-time. After receiving the first indication information, the terminal device may determine the position or proportion occupied by the first transient time in the spacing symbol, according to the second transient time, the third transient time, the second transient sub-time and the fourth transient sub-time. In another example, the first indication information may indicate other parameters, and after receiving the first indication information, the terminal device may determine the position or proportion occupied by the first transient time in the spacing symbol according to said other parameters.

Accordingly, the terminal device may send the first capability information to the network device, and then after receiving the first indication information fed back by the network device for the second transient time and the third transient time, the terminal device may determine the position or proportion occupied by the first transient time in the spacing symbol.

In another possible implementation, acquiring, by the communication device, the position or proportion occupied by the first transient time in the spacing symbol may include: when the communication device is a network device, receiving, by the network device, second capability information of the terminal device sent by the terminal device, wherein the second capability information is used for indicating the proportion occupied by the first transient time in the spacing symbol.

Optionally, the proportion of the first transient time in the spacing symbol, which is indicated by the second capability information, may be a specific numerical value, e.g., 10%.

Optionally, the proportion of the first transient time in the spacing symbol, which is indicated by the second capability information, may be a proportion range, e.g., 10%-15%.

Optionally, the terminal device may send the second capability information to the network device periodically. For example, the terminal device may send the second capability information to the network device every 1 ms.

Optionally, the sending of the second capability information by the terminal device to the network device may be an event-triggered sending. For example, the terminal device may send the second capability information to the network device when performing a cell handover, or the terminal device may send the second capability information to the network device when performing an initial access.

It should be noted that as to the description of sending the second capability information to the network device by the terminal device, reference may be made to the description of sending the first capability information to the network device by the terminal device, which will not be described further here for brevity.

After the communication device acquires the position or proportion occupied by the first transient time in the spacing symbol, the communication device may determine whether to transmit data on the spacing symbol, on the basis of the position or proportion occupied by the first transient time in the spacing symbol.

When the communication device is a network device, in one implementation, determining, by the communication device, whether to transmit data on the spacing symbol on the basis of the position or proportion occupied by the first transient time in the spacing symbol may include: if the proportion of the first transient time in the spacing symbol is less than or equal to a first threshold, determining, by the network device, that data can be transmitted on the spacing symbol: and if the proportion of the first transient time in the spacing symbol is greater than the first threshold, determining, by the network device, not to transmit data on the spacing symbol.

Optionally, the first threshold may be specified by a protocol.

Optionally, the first threshold may be preconfigured by the network device. In such a case, the network device may send information indicating the first threshold to the terminal device, and the terminal device may determine the first threshold after receiving the information.

Optionally, the first threshold may be 50%.

For example, when the working frequency band of the terminal device is below 6 GHz and the subcarrier spacing is greater than or equal to 60 KHz, if the first transient time is a relatively small value, e.g., 3 μs, the first transient time is entirely within the spacing symbol, the length of the spacing symbol is 17.86 μs, and the first transient time occupies 6 μs of the spacing symbol, accounting for 33%, which is less than the first threshold, then the network device determines that data can be transmitted on the spacing symbol, i.e., the spacing symbol is not a blank symbol, and can be scheduled by the network device to transmit data and can be recovered.

In another example, the first transient time is a relatively small value, e.g., 4.5 μs, the first transient time is entirely within the spacing symbol, the length of the spacing symbol is 17.86 μs, and the first transient time occupies 9 μs of the spacing symbol, accounting for 50%, which is equal to the first threshold, then the network device determines that data can be transmitted on the spacing symbol, i.e., the spacing symbol is not a blank symbol, and can be scheduled by the network device to transmit data and can be recovered.

In a further example, the first transient time is a relatively large value, e.g., 7 μs, the first transient time is entirely within the spacing symbol, the length of the spacing symbol is 17.86 μs, and the first transient time occupies 14 μs of the spacing symbol, accounting for 78%, which is greater than the first threshold, then the network device determines that data cannot be transmitted on the spacing symbol, that is, the spacing symbol is a blank symbol.

In a still further example, the first transient time is a relatively large value, e.g., 9 μs, the first transient time is entirely within the spacing symbol, the length of the spacing symbol is 17.86 μs, and the first transient time occupies 18 μs of the spacing symbol, accounting for 100.7%, which is greater than the first threshold, then the network device determines that data cannot be transmitted on the spacing symbol, that is, the spacing symbol is a blank symbol.

It should be understood that specific examples in the implementations of the present disclosure are only intended to help those skilled in the art to better understand the implementations of the present disclosure, and are not intended to limit the scope of the implementations of the present disclosure.

Optionally, in an implementation of the present disclosure, if the spacing symbol includes two symbols, which are a first symbol and a second symbol, the first transient sub-time occupies the first symbol, the third transient sub-time occupies the second symbol, the proportion of the first transient sub-time in the first symbol is less than the first threshold, and the proportion of the third transient sub-time in the second symbol is greater than the first threshold, then the network device does not transmit data on the first symbol and the second symbol, or the network device may transmit data on the first symbol, but does not transmit data on the second symbol.

When the network device may transmit data on the first symbol but does not transmit data on the second symbol, the network device may determine the first symbol as a short subslot when transmitting data next time, or may combine the first symbol and its adjacent symbol into a short subslot.

In another implementation, determining, by the communication device, whether to transmit data on the spacing symbol on the basis of the position or proportion occupied by the first transient time in the spacing symbol may include: if the position occupied by the first transient time in the spacing symbol exceeds a first position, determining, by the network device, that data cannot be transmitted on the spacing symbol, i.e., the spacing symbol is a blank symbol: and if the position occupied by the first transient time in the spacing symbol does not exceed the first position, determining, by the network device, that data can be transmitted on the spacing symbol, i.e., the spacing symbol is not a blank symbol.

Optionally, the first position may be specified by a protocol or determined by the network device.

Optionally, the first position may include a first sub-position and a second sub-position. The first sub-position is a position of the first position in an end part of the spacing symbol, and the second sub-position is a position of the first position in the other end part of the spacing symbol.

As an example, if the position occupied by the first transient sub-time in the spacing symbol exceeds the first sub-position, and the position occupied by the third transient sub-time in the spacing symbol exceeds the second sub-position, the network device may determine not to transmit data on the spacing symbol.

As another example, if the position occupied by the first transient sub-time in the spacing symbol does not exceed the first sub-position, and the position occupied by the third transient sub-time in the spacing symbol does not exceed the second sub-position, the network device determines that data can be transmitted on the spacing symbol.

As a further example, if the position occupied by the first transient sub-time in the spacing symbol exceeds the first sub-position, and the position occupied by the third transient sub-time in the spacing symbol does not exceed the second sub-position, the network device may determine not to transmit data on the spacing symbol.

Alternatively, if the spacing symbol includes two symbols, which are a first symbol and a second symbol, the first sub-position is in the first symbol, and the second sub-position is in the second symbol, the network device determines that data cannot be transmitted on the first symbol, but can be transmitted on the second symbol.

In such a case, the network device may determine the second symbol as a short subslot when transmitting data next time, or may make the second symbol and its adjacent symbol form into a short subslot.

When performing uplink transmission, as an example, the terminal device may determine whether to transmit data on the spacing symbol on the basis of the position or proportion occupied by the first transient time in the spacing symbol.

It should be understood that as to the specific implementation of determining, by the terminal device, whether to transmit data on the spacing symbol on the basis of the position or proportion occupied by the first transient time in the spacing symbol, reference may be made to the implementation of determining, by the network device, whether to transmit data on the spacing symbol on the basis of the position or proportion occupied by the first transient time in the spacing symbol, which will not be described further here for brevity.

As another example, after determining whether to transmit data on a spacing symbol on the basis of the position or proportion occupied by the transient time in the spacing symbol, the network device may send second indication information to the terminal device, wherein the second indication information may be used for indicating whether to transmit data on the spacing symbol.

Optionally, the second indication information may indicate, by at least one bit or a first parameter, whether data can be transmitted on the spacing symbol.

Illustratively, the second indication information may indicate, by at least one bit, whether data can be transmitted on the spacing symbol.

For example, the second indication information may indicate, by bit "1", that data can be transmitted on the spacing symbol and indicate, by bit "0", that data cannot be transmitted on the spacing symbol.

In another example, there may be a plurality of bits in the second indication information. If the a plurality of bits are the same, it means that data can be transmitted on the spacing symbol: and if at least two of the plurality of bits are different, it means that data cannot be transmitted on the spacing symbol. For example, "000" indicates that data can be transmitted on the spacing symbol, while "010" indicates that data cannot be transmitted on the spacing symbol.

Illustratively, the second indication information may indicate, by a first parameter, whether data can be transmitted on the spacing symbol.

For example, if the second indication information includes the first parameter, it means that data can be transmitted on the spacing symbol: and if the second indication information does not include the first parameter, it means that data cannot be transmitted on the spacing symbol.

It should be noted that the first parameter is not specifically limited in the implementations of the present disclosure, and any parameter that can indicate whether data can be transmitted on the spacing symbol is included in the protection scope of the present disclosure.

Optionally, in an implementation of the present disclosure, the method 400 may further include: acquiring, by the communication device, a second parameter, and then determining, according to the acquired second parameter, the quantity of allowed occurrences of the first transient time within a preset time period. The second parameter may include, but is not limited to, at least one of subcarrier spacing, Channel Quality Indicator (CQI), code rate and block error rate.

In such a case, determining, by the communication device, whether to transmit data on the spacing symbol on the basis of the position or proportion occupied by the first transient time in the spacing symbol may include: when the first transient time occurs within a range of the quantity of allowed occurrences of the first transient time within the preset time period, determining, by the communication device, whether to transmit data on the spacing symbol on the basis of the position or proportion occupied by the first transient time in the spacing symbol.

It should be understood that when a constraint condition is met, the communication device may determine the quantity of allowed occurrences of the first transient time within the preset time period according to at least one of subcarrier spacing, channel quality indicator, code rate and block error rate. Otherwise, the communication device may set the quantity of allowed occurrences of the first transient time within the preset time period as a default value, e.g., 5, or may not set the quantity of allowed occurrences of the first transient time within the preset time period.

The constraint condition may be that the working frequency of the terminal device is below 6 GHz and the subcarrier spacing is greater than or equal to 60 KHz, or the working frequency of the terminal device is above 6 GHz and the subcarrier spacing is greater than or equal to 120 KHz.

When the constraint condition is met, in one implementation, determining, by the communication device, the quantity of allowed occurrences of the first transient time within the preset time period according to the second parameter may include: comparing, by the communication device, the second parameter with a preset value to obtain a comparison result, then selecting, by the communication device, a value from a set of maximum quantities on the basis of the obtained comparison result, and determining the value as the quantity of allowed occurrences of the first transient time within the preset time period. The preset time period may be a radio frame.

Optionally, if one spacing symbol includes one symbol, the set of maximum quantities may be { 0, 1, . . . , 14} ; and if one spacing symbol includes two symbols, the set of maximum quantities may be { 0, 1, . . . , 7} .

Illustratively, when one spacing symbol includes one symbol, if the second parameter is CQI, and the second parameter is less than the preset value, it is indicated that the channel condition is poor at this time, the communication device may select a value from { 0, 1, . . . , 7} in { 0, 1, . . . , 14} , and take the selected value as the quantity of allowed occurrences of the first transient time within the preset time period.

For example, the communication device may randomly select a value from { 0, 1, . . . , 7} , or may select a value from { 0, 1, . . . , 7} on the basis of a difference between the second parameter and the preset value. If the preset value is 15 and the CQI acquired by the communication device is 4, the communication device may select 2 and determine 2 as the quantity of allowed occurrences of the first transient time within the preset time period.

Further illustratively, when one spacing symbol includes one symbol, if the second parameter is CQI, and the second parameter is greater than the preset value, it is indicated that the channel condition is good at this time, the communication device may select a value from { 8, 9, . . . , 14} in { 0, 1, . . . , 14} , and take the selected value as the quantity of allowed occurrences of the first transient time within the preset time period.

For example, the communication device may randomly select a value from { 8, 9, . . . , 14} , or may select a value from { 8, 9, . . . , 14} on the basis of a difference between the second parameter and the preset value. If the preset value is 15 and the CQI acquired by the communication device is 20, the communication device may select 8 and determine 8 as the quantity of allowed occurrences of the first transient time within the preset time period.

In another implementation, the second parameter may have a mapping relationship with the quantity of allowed occurrences of the first transient time within the preset time period. After acquiring the second parameter, the communication device may determine the quantity of allowed occurrences of the first transient time within the preset time period according to the acquired second parameter and the mapping relationship mentioned above.

For example, a block error rate of 10% corresponds to 8 allowed occurrences of the first transient time within the preset time period, and a block error rate of 30% corresponds to 5 allowed occurrences of the first transient time within the preset time period. If the block error rate acquired by the communication device is 10%, the communication device may determine that the quantity of allowed occurrences of the first transient time within the preset time period is 8.

The mapping relationship between the second parameter and the quantity of allowed occurrences of the first transient time within the preset time period may be preset or determined according to signaling. Illustratively, when the communication device is a terminal device, the network device may send mapping information to the terminal device, and the terminal device may determine, according to the mapping information, the mapping relationship between the second parameter and the quantity of allowed occurrences of the first transient time within the preset time period.

Optionally, when the communication device is a network device, after determining, by the network device, the quantity of allowed occurrences of the first transient time within the preset time period, the method may further include: sending, by the network device, third indication information to the terminal device, wherein the third indication information may be used for indicating the quantity of allowed occurrences of the first transient time within the preset time period.

According to the above technical solution, a base station may determine the quantity of allowed occurrences of a transient time within a preset time period according to at least one of subcarrier spacing, channel quality indicator, code rate and block error rate, which can limit frequent occurrences of the transient time, thereby enhancing the chances of transmitting data on a spacing symbol by the communication device, increasing the scheduling flexibility of the communication device and ensuring the reliability of data transmission when the subcarrier spacing is relatively large.

It should be understood that the method of an implementation of the present disclosure may alternatively be applied to a scenario in which when a transient time is on one side of a short subslot, the communication device determines whether to transmit data on the short subslot. As to the details, reference may be made to the implementation of determining, by the communication device, whether to transmit data on a spacing symbol, which will not be described in detail here.

It should also be understood that sequence numbers of the foregoing processes do not mean execution sequences in various implementations of the present disclosure. The execution sequences of the processes should be determined according to functions and internal logic of the processes, and should not constitute any limitation on the implementation processes of the implementations of the present disclosure.

In an implementation of the present disclosure, the communication device determines, through the acquired position or proportion occupied by a transient time in a spacing symbol, whether to transmit data on the spacing symbol, so that whether to transmit data on the spacing symbol can be determined with a high accuracy.

The communication method according to an implementation of the present disclosure have been described in detail above, next, a communication apparatus according to an implementation of the present disclosure will be described with reference to FIGS. 5 and 6. The technical features described in the method implementations are applicable to the following apparatus implementations.

Figure 5:
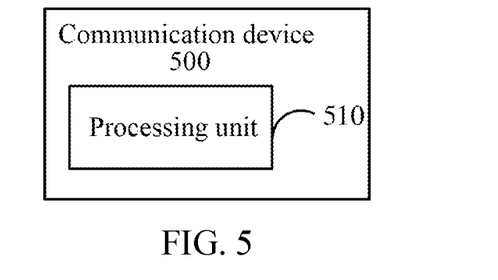
FIG. 5 is a schematic block diagram of a communication device according to an implementation of the present disclosure.

FIG. 5 is a schematic block diagram of a communication device 500 according to an implementation of the present disclosure. As shown in FIG. 5, the communication device 500 includes a processing unit 510.

The processing unit 510 is configured to acquire a position or proportion occupied by a first transient time in a spacing symbol.

The processing unit 510 is further configured to determine, on the basis of the position or proportion occupied by the first transient time in the spacing symbol, whether to transmit data on the spacing symbol.

Optionally, in an implementation of the present disclosure, the second transient time includes a first transient sub-time and a second transient sub-time, the first transient sub-time is a time occupied by the first transient time in an end part of the spacing symbol, the second transient sub-time is a time occupied by the second transient time in a first short subslot, and the first short subslot and the spacing symbol are continuous in time domain.

Optionally, in an implementation of the present disclosure, the first transient sub-time and the second transient sub-time are different.

Optionally, in an implementation of the present disclosure, the processing unit 510 is specifically configured to determine to transmit data on the spacing symbol, if the proportion of occupied by the first transient time in the spacing symbol is less than or equal to a first threshold: and determine not to transmit data on the spacing symbol, if the proportion occupied by the first transient time in the spacing symbol is greater than the first threshold.

Optionally, in an implementation of the present disclosure, the processing unit 510 is specifically configured to determine the position or proportion occupied by the first transient time in the spacing symbol, on the basis of a second transient time, a third transient time and a preset rule, wherein the second transient time includes a time occupied by the first transient time in an end part of the spacing symbol, and the third transient time includes a time occupied by the first transient time in the other end part of the spacing symbol.

Optionally, in an implementation of the present disclosure, the communication device 500 is a network device. The communication device 500 further includes a communication unit 520.

The communication unit 520 is configured to receive first capability information of a terminal device sent by the terminal device, wherein the first capability information is used for indicating the second transient time and the third transient time. The processing unit 510 is specifically configured to determine the position or proportion occupied by the first transient time in the spacing symbol, on the basis of the second transient time, the third transient time and the preset rule.

Optionally, in an implementation of the present disclosure, the communication unit 520 is further configured to send first indication information to the terminal device, the first indication information being used for indicating the position or proportion occupied by the first transient time in the spacing symbol.

Optionally, in an implementation of the present disclosure, the communication device 500 is a network device, and the communication device 500 further includes: a communication unit 520 configured to receive second capability information of the terminal device sent by the terminal device, the second capability information being used for indicating the proportion occupied by the first transient time in the spacing symbol.

Optionally, in an implementation of the present disclosure, the communication unit 520 is further configured to send second indication information to the terminal device, the second indication information being used for indicating whether to transmit data on the spacing symbol.

Optionally, in an implementation of the present disclosure, the communication device 500 is a terminal device. The communication device 500 further includes: a communication unit 520 configured to send first capability information to a network device, the first capability information being used for indicating a second transient time and a third transient time, wherein the second transient time includes a time occupied by the first transient time in an end part of the spacing symbol, and the third transient time includes a time occupied by the first transient time in the other end part of the spacing symbol.

The communication unit 520 is further configured to receive first indication information fed back by the network device for the second transient time and the third transient time, the first indication information being used for indicating the position or proportion occupied by the first transient time in the spacing symbol.

Optionally, in an implementation of the present disclosure, the processing unit 510 is further configured to acquire at least one of subcarrier spacing, channel quality indicator, code rate and block error rate: and determine the quantity of allowed occurrences of the first transient time within a preset time period according to the at least one of subcarrier spacing, channel quality indicator, code rate and block error rate.

The processing unit 510 is specifically configured to determine, on the basis of the position or proportion occupied by the first transient time in the spacing symbol, whether to transmit data on the spacing symbol, when the first transient time occurs within a range of the quantity of allowed occurrences of the first transient time within the preset time period.

Optionally, in an implementation of the present disclosure, the processing unit 510 is specifically configured to compare at least one of subcarrier spacing, channel quality indicator, code rate and block error rate with a preset value to obtain a comparison result: and determine the quantity of allowed occurrences of the first transient time within the preset time period on the basis of the comparison result.

Optionally, in an implementation of the present disclosure, the communication device 500 is a network device. The communication device 500 further includes a communication unit 520 configured to send third indication information to the terminal device, the third indication information being used for indicating the quantity of allowed occurrences of the first transient time within the preset time period.

It should be understood that the communication device 500 may correspond to the communication device in the method 400, and may implement a corresponding operation of the communication device in the method 400, which will not be described in detail here for brevity.

Figure 6:
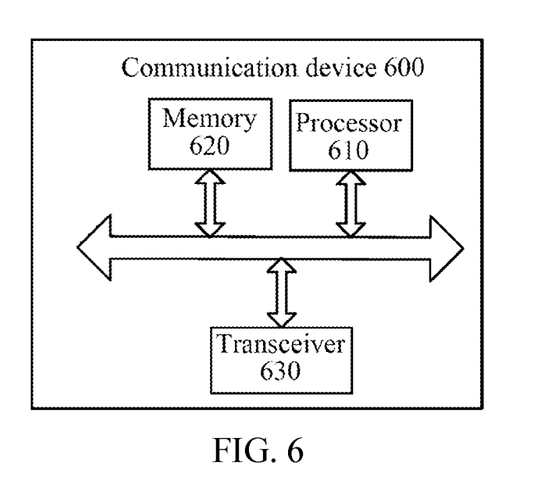
FIG. 6 is a schematic block diagram of a communication device according to an implementation of the present disclosure.

FIG. 6 is a schematic structural diagram of a communication device 600 according to an implementation of the present disclosure. The communication device 600 shown in FIG. 6 includes a processor 610. The processor 610 may call and run a computer program from a memory to implement the methods in the implementations of the present disclosure.

Optionally, as shown in FIG. 6, the communication device 600 may further include a memory 620. The processor 610 may call and run a computer program from the memory 620 to implement the methods in the implementations of the present disclosure.

The memory 620 may be a separate device independent of the processor 610 or may be integrated in the processor 610.

Optionally, as shown in FIG. 6, the communication device 600 may further include a transceiver 630, and the processor 610 may control the transceiver 630 to communicate with other devices. Specifically, the transceiver 630 may send information or data to other devices or receive information or data sent by other devices.

The transceiver 630 may include a transmitter and a receiver. The transceiver 630 may further include antennas, and the quantity of antennas may be one or more.

Optionally, the communication device 600 may be specifically a communication device of an implementation of the present disclosure, and the communication device 600 may implement the corresponding flows implemented by the communication device in various methods of the implementations of the present disclosure, which will not be repeated here for brevity.

Figure 7:
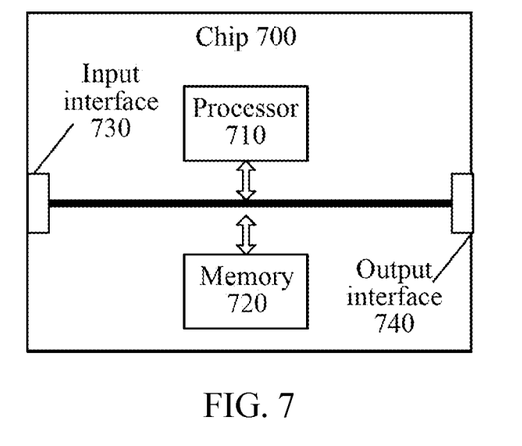
FIG. 7 is a schematic block diagram of a chip according to an implementation of the present disclosure.

FIG. 7 is a schematic diagram of a structure of a chip according to an implementation of the present disclosure. A chip 700 shown in FIG. 7 includes a processor 710. The processor 710 may call and run a computer program from a memory to implement the methods in the implementations of the present disclosure.

Optionally, as shown in FIG. 7, the chip 700 may further include a memory 720. The processor 710 may call and run a computer program from the memory 720 to implement the methods in the implementations of the present disclosure.

The memory 720 may be a separate device independent of the processor 710 or may be integrated in the processor 710.

Optionally, the chip 700 may further include an input interface 730. The processor 710 may control the input interface 730 to communicate with other devices or chips, and specifically, may acquire information or data sent by other devices or chips.

Optionally, the chip 700 may further include an output interface 740. The processor 710 may control the output interface 740 to communicate with other devices or chips, and specifically, may output information or data to other devices or chips.

Optionally, the chip may be applied to a communication device of an implementation of the present disclosure, and the chip may implement corresponding flows implemented by the communication device in various methods of the implementations of the present disclosure, which will not be repeated here for brevity.

It should be understood that the chip mentioned in the implementation of the present disclosure may also be referred to as a system-level chip, a system chip, a chip system or a system-on-chip, etc.

It should be understood that the processor in the implementation of this application may be an integrated circuit chip having a signal processing capability. In an implementation process, the steps of the foregoing method implementations may be implemented by an integrated logic circuit of hardware in the processor or instructions in a form of software. The processor may be a general purpose processor, a Digital Signal Processor (DSP), an Application Specific Integrated Circuit (ASIC), a Field Programmable Gate Array (FPGA) or other programmable logic devices, a discrete gate or a transistor logic device, or a discrete hardware component. The processor may implement or execute methods, acts and logical block diagrams disclosed in the implementations of this application. The general purpose processor may be a microprocessor, or the processor may be any conventional processor or the like. The acts of the methods disclosed with reference to the implementations of this application may be directly implemented by a hardware decoding processor, or may be implemented by a combination of hardware and software modules in the decoding processor. The software modules may be located in a storage medium commonly used in the art, such as a random access memory, a flash memory, a read-only memory, a programmable read-only memory or an electrically erasable programmable memory, or a register. The storage medium is located in a memory, and the processor reads the information in the memory and completes the acts of the above methods in combination with its hardware.

It may be understood that the memory in the implementation of this application may be a transitory memory or a non-transitory memory, or may include both a transitory memory and a non-transitory memory. The non-transitory memory may be a Read-Only Memory (ROM), a Programmable ROM (PROM), an Erasable PROM (EPROM), an Electrically EPROM (EEPROM), or a flash memory. The transitory memory may be a Random Access Memory (RAM) which serves as an external cache. By way of exemplary but not restrictive illustrations, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It should be noted that the memory in the systems and methods described here is intended to include, without being limited to, these and any other suitable types of memory.

It should be understood that the foregoing memory is an example for illustration, but not for limiting. For example, the memory in the implementations of the present disclosure may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), a Direct Rambus RAM (DR RAM), or the like. That is, memories in the implementations of the present disclosure are intended to include, without being limited to, these and any other suitable types of memories.

An implementation of the present disclosure further provides a computer readable storage medium for storing a computer program.

Optionally, the computer readable storage medium may be applied to a communication device of an implementation of the present disclosure, and the computer program enables a computer to perform corresponding flows implemented by the communication device in various methods of the implementations of the present disclosure, which will not be repeated here for brevity.

An implementation of the present disclosure also provides a computer program product including computer program instructions.

Optionally, the computer program product may be applied to a communication device of an implementation of the present disclosure, and the computer program instructions enable a computer to perform corresponding flows implemented by the communication device in various methods of the implementations of the present disclosure, which will not be repeated here for brevity.

An implementation of the present disclosure also provides a computer program.

Optionally, the computer program may be applied to a communication device of an implementation of the present disclosure. When run on a computer, the computer program enables the computer to execute corresponding processes implemented by the communication device in various methods of the implementations of the present disclosure, which will not be repeated here for brevity.

Those of ordinary skills in the art may recognize that the exemplary units and algorithm steps described in combination with the implementations disclosed herein may be implemented in electronic hardware, or a combination of computer software and electronic hardware. Whether these functions are implemented in hardware or software depends on the specific application and design constraints of the technical solutions. Professional technicians may use different methods to implement the described functions in respect to each particular application, but such implementation should not be considered to be beyond the scope of the present disclosure.

Those skilled in the art may clearly understand that for convenience and conciseness of description, as to the specific working processes of the systems, apparatuses and units described above, reference may be made to the corresponding processes in the method implementations, which will not be repeated here.

In several implementations provided by the present disclosure, it should be understood that the disclosed systems, apparatuses and methods may be implemented in other ways. For example, the apparatus implementations described above are only illustrative, for example, the division of the units is only a logical function division, and there may be other division manners in actual implementation, for example, a plurality of units or components may be combined or integrated into another system, or some features may be ignored or not executed. On the other hand, the mutual coupling or direct coupling or communication connection shown or discussed may be indirect coupling or communication connection through some interfaces, apparatuses or units, and may be in electrical, mechanical or other forms.

The unit described as a separate component may or may not be physically separated, and the component shown as a unit may or may not be a physical unit, i.e., it may be located in one place or may be distributed over a plurality of network units. Some or all of the units may be selected according to actual needs to achieve the objects of the solutions of the implementations.

In addition, various functional units in various implementations of the present disclosure may be integrated in one processing unit, or the various units may be physically present separately, or two or more units may be integrated in one unit.

The functions may be stored in a computer readable storage medium if realized in a form of software functional units and sold or used as a separate product. Based on this understanding, the technical solution of the present disclosure, in essence, or the part contributing to the prior art, or the part of the technical solution, may be embodied in the form of a software product stored in a storage medium, including a number of instructions for causing a computer device (which may be a personal computer, a server, or a network device and the like) to perform all or part of the acts of the methods described in various implementations of the present disclosure. The storage medium includes various mediums capable of storing program codes, such as a USB flash disk, a removable hard disk, a Read-Only Memory (ROM), a Random Access Memory (RAM), a magnetic disk, or an optical disk.

What are described above are merely exemplary implementations of the present disclosure, but the protection scope of the present disclosure is not limited thereto. Any variation or substitution that may be easily conceived by a person skilled in the art within the technical scope disclosed by the present disclosure shall be included within the protection scope of the present disclosure. Therefore, the protection scope of the present disclosure shall be determined by the protection scope of the claims.

I claim:

1. A communication method, comprising:
    acquiring, by a communication device, a position or proportion occupied by a first transient time in a spacing symbol; and
    determining, by the communication device, whether to transmit data on the spacing symbol based on the position or proportion occupied by the first transient time in the spacing symbol;
    wherein the spacing symbol is a short subslot with transient times on both sides.

2. The method of claim 1, wherein determining, by the communication device, whether to transmit data on the spacing symbol based on the position or proportion occupied by the first transient time in the spacing symbol comprises:
    determining, by the communication device, to transmit data on the spacing symbol if the proportion occupied by the first transient time in the spacing symbol is less than or equal to a first threshold; and
    determining, by the communication device, not to transmit data on the spacing symbol if the proportion occupied by the first transient time in the spacing symbol is greater than the first threshold.

3. The method of claim 1, wherein the method further comprises:
    sending, by the network device, first indication information to the terminal device, wherein the first indication information is used for indicating the position or proportion occupied by the first transient time in the spacing symbol.

4. The method of claim 1, wherein the communication device is a network device, and acquiring, by the communication device, the position or proportion occupied by the first transient time in the spacing symbol comprises:
    receiving, by the network device, second capability information of a terminal device sent by the terminal device, wherein the second capability information is used for indicating the proportion occupied by the first transient time in the spacing symbol.

5. The method of claim 1, wherein the method further comprises:
sending, by the network device, second indication information to the terminal device, wherein the second indication information is used for indicating whether to transmit data on the spacing symbol.

6. The method of claim 1, wherein the communication device is a terminal device, and acquiring, by the communication device, the position or proportion occupied by the first transient time in the spacing symbol comprises:
sending, by the terminal device, first capability information to a network device, wherein the first capability information is used for indicating a second transient time and a third transient time, the second transient time comprises a time occupied by the first transient time in an end part of the spacing symbol, and the third transient time comprises a time occupied by the first transient time in the other end part of the spacing symbol; and
receiving, by the terminal device, first indication information fed back by the network device for the second transient time and the third transient time, wherein the first indication information is used for indicating the position or proportion occupied by the first transient time in the spacing symbol.

7. A communication device, comprising: a processor and a transceiver, wherein
the processor is configured to acquire a position or proportion occupied by a first transient time in a spacing symbol,
wherein the processor is further configured to determine whether to transmit data on the spacing symbol based on the position or proportion occupied by the first transient time in the spacing symbol;
wherein the spacing symbol is a short subslot with transient times on both sides.

8. The communication device of claim 7, wherein the processor is configured to:
determine to transmit data on the spacing symbol, if the proportion occupied by the first transient time in the spacing symbol is less than or equal to a first threshold; and
determine not to transmit data on the spacing symbol, if the proportion occupied by the first transient time in the spacing symbol is greater than the first threshold.

9. The communication device of claim 7, wherein the transceiver is configured to:
send first indication information to the terminal device, wherein the first indication information is used for indicating the position or proportion occupied by the first transient time in the spacing symbol.

10. The communication device of claim 7, wherein the communication device is a network device, and the transceiver is configured to receive second capability information of a terminal device sent by the terminal device, wherein the second capability information is used for indicating the proportion occupied by the first transient time in the spacing symbol.

11. The communication device of claim 7, wherein the transceiver is configured to:
send second indication information to the terminal device, wherein the second indication information is used for indicating whether to transmit data on the spacing symbol.

12. The communication device of claim 7, wherein the communication device is a terminal device, and the transceiver is configured to send first capability information to a network device, wherein the first capability information is used for indicating a second transient time and a third transient time, wherein the second transient time includes a time occupied by the first transient time in an end part of the spacing symbol, and the third transient time includes a time occupied by the first transient time in the other end part of the spacing symbol,
the transceiver is further configured to receive first indication information fed back by the network device for the second transient time and the third transient time, wherein the first indication information is used for indicating the position or proportion occupied by the first transient time in the spacing symbol.

* * * * *